Patented July 6, 1937

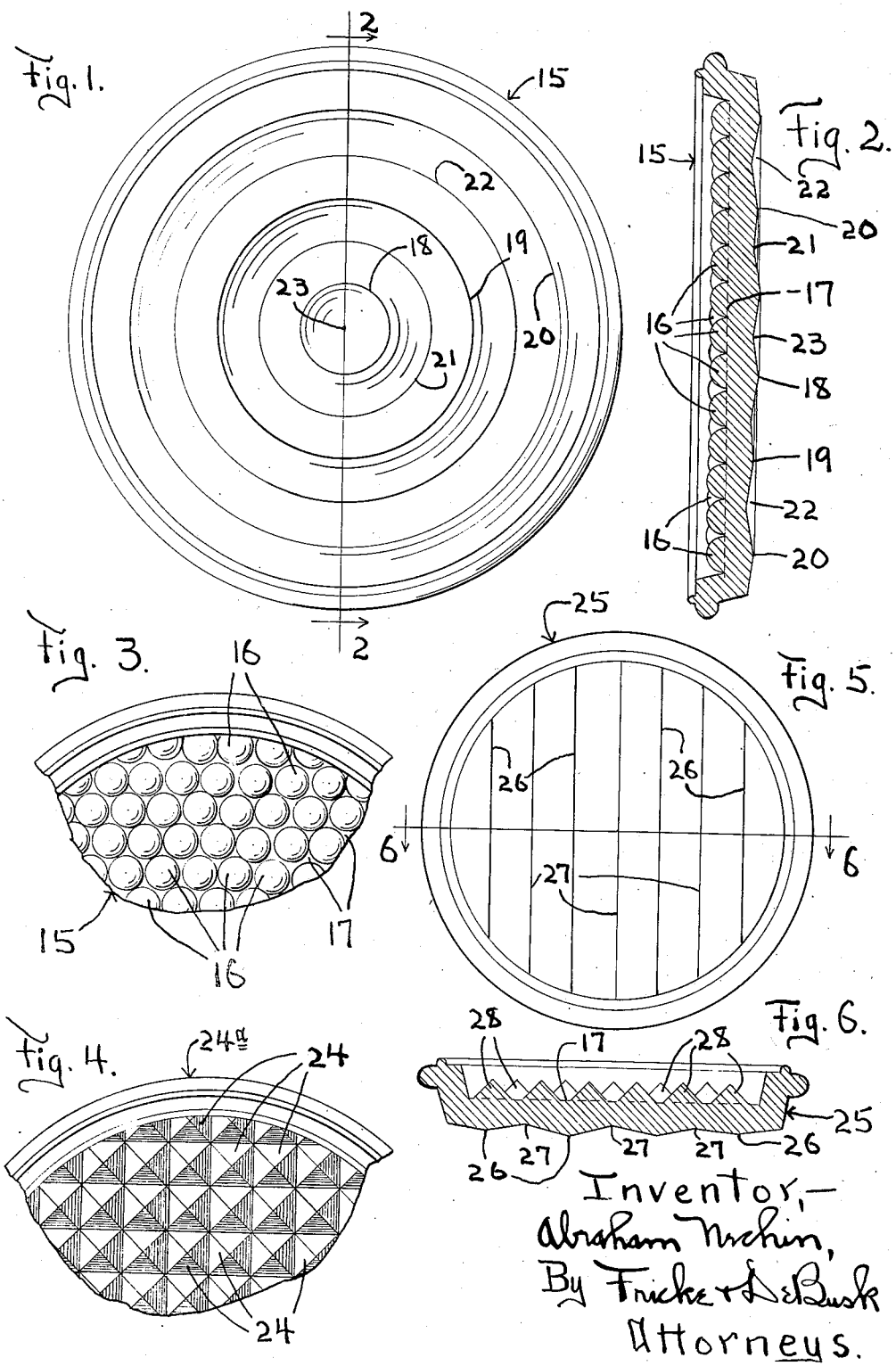

2,086,388

UNITED STATES PATENT OFFICE 2,086,388

REFLECTOR LENS

Abraham Nechin, Chicago, Ill., assignor to American Automatic Devices Co., Chicago, Ill., a corporation of Illinois Application October 20, 1933, Serial No. 694,382

3 Claims. (Cl. 88—78)

My invention relates to lenses of the type adapted to act as reflectors, and it is the principal object of my invention to provide a new and improved form and arrangement of parts by virtue of which there shall be a substantial reflection of light backwardly along the path of incidence or along lines parallel or substantially parallel to said path for all rays of light approaching the lens along the axis of the lens or along a path making only a comparatively small angle with respect to said axis. It is one of the objects of my invention to provide an improved arrangement of this type by which there shall be increased reflection backwardly along lines parallel with the direction of approach for rays of light striking the lens at various angles. To these ends, it is one of the objects of my invention to provide an improved arrangement of cooperating reflecting and refracting surfaces such as to insure that any ray striking the front face of the lens at a comparatively small angle from the axis of the lens shall enter at at least a portion of the face in such direction as to be directed backwardly in parallel relation or in substantially parallel relation to the direction of contact, it being one of my objects to provide an increased proportion of such substantially parallel reflection. For accomplishing this purpose, it has been one of my objects to provide an arrangement comprising a front face of differentially angled formation, the differently angled portions of which face are adapted by coaction with the cooperating parts to give rays from correspondingly different directions the desired differential return for attaining the desired results.

It is one of the objects of my invention to provide an arrangement of this type by which for a ray approaching at any comparatively small angle with respect to the axis of the lens there shall be a considerable number of separate sections or portions of the face of the lens distributed at a variety of points about the axis of the lens which shall at the same time be effective to a comparatively high degree for reflecting the ray backwardly along or approximately along its path of approach, whereby an effective and substantial portion of the total strength of any such ray is turned back upon its path. It is another object of my invention to provide an arrangement of parts by reason of which the reflection of light from the front face of the lens shall be kept to a minimum and the reflection from the back face shall be kept to a maximum, thus insuring a filtering effect by which the desired color control is brought about in connection with the reflected ray.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a front face view of a lens embodying my improved arrangement;

Fig. 2 is a cross sectional view taken at line 2—2 of Fig. 1;

Fig. 3 is a rear face view of a fragmentary portion of my improved lens;

Fig. 4 is a rear face view of a fragmentary portion of a modified form of lens embodying a changed arrangement at the rear face of the lens;

Fig. 5 is a front face view of still another modified form of device; and

Fig. 6 is a cross sectional view taken at line 6—6 of Fig. 5.

Referring now particularly to Figs. 1, 2, and 3, 15 indicates one form of my improved lens, made of either clear or colored glass or other suitable material such that a ray of light upon striking the lens from the front is adapted to be reflected or refracted in accordance with well understood principles. As is best shown in Fig. 2, the rear face portion of the body of the lens comprises a plurality of backwardly extending projections 16 rounded at their rear end portions, with all of such projections 16 terminating in a plane extending transversely of the lens. As is best shown in Fig. 3, the projections 16 are in slightly spaced relation to each other at portions of their bases upon a surface 17 in the form of a plane parallel with the plane defining the rear ends of the projections. In the arrangement shown, each of the projections 16 is hemispherical in form, or at least closely approximates such form.

As is best shown in Fig. 1, the front face of my improved lens is provided with alternate shallow ribs and grooves arranged in the form of rings about the axis of the lens. The arrangement as shown comprises an annular ridge 18 surrounded successively by other annular ridges 19 and 20 concentric with the ridge 18. This arrangement serves to provide an annular groove 21 between the ridges 18 and 19 and an annular groove 22 between the ridges 19 and 20, and to provide a conical depression 23 at the middle of the lens.

As will be readily seen by an inspection of Fig. 2, the faces defining the ridges and grooves are positioned at a variety of degrees of angularity with respect to the axis of the lens and with respect to the plane 17 upon which the projections 16 are mounted. I have found in practice that a lens of this type, molded or cast of glass upon a commercial basis without too much attention to precise accuracy from a technical standpoint, reflects back along the path of approach or approximately along said path a substantial and effective portion of a ray approaching the lens along the axis of the lens or at any comparatively small angle from said axis up to at least 30°, when said faces defining the ridges and grooves have a slight angularity with respect to the transverse plane 17. For example, I have found a lens satisfactory with such face portions arranged at different angles from said plane 17, varying say from three to ten degrees.

I have found in practice that by the use of my improved arrangement embodying the differently angled portions of the front face of the lens the reflection at the front face of the lens is very slight, as is shown by the high degree of coloration of the reflected ray. I have found this to be true both when the light strikes the lens from directly in front along the axis of the lens and when the light approaches the lens at any desired angle from the axis up to an angularity of at least 30°.

In the arrangement shown in Fig. 4, projections 24 of pyramidal form are substituted for the hemispherical projections of Figs. 1, 2, and 3, such pyramids being closely associated with each other throughout the entire rear face of the lens, with the pyramids terminating in a plane positioned transversely of the lens 24a of said figure.

In the form of device as shown in Figs. 5 and 6, the arrangement at the front face of the lens is the same as that above described in connection with Figs. 1, 2, and 3, except that the alternate shallow grooves and ridges of the device of Figs. 5 and 6 are arranged parallel with each other across the face of the lens rather than in the concentric form as above described. In said Figs. 5 and 6, a lens 25 is provided with a plurality of shallow ridges 26 thereacross in parallel relation, providing shallow grooves 27 between the ridges. In the arrangement shown, the faces defining the ridges and grooves have a variety of degrees of angularity with respect to the transverse plane 17 varying from three to ten degrees. On its rear face, the lens is provided with projections 28 in spaced relation to each other on the plane 17, preferably in the form of right cones.

I have found in practice that the rear face portion of each of the lenses 15, 24a, and 25 is efficient for reflecting forwardly the light penetrating the lens from the front, the arrangement being such that when a white light strikes the lens from the front a ray of colored light is sent back along approximately the same path, the color of the light corresponding of course to the color of the material of the lens.

By reason of my improved arrangement, I am enabled to produce very cheaply and very readily reflector lenses which have a high degree of efficiency with respect to the reflection of light backwardly along the line of approach, or approximately so and which have a high degree of efficiency with respect to the coloration of the reflected ray by reason of the diversity of angularity of different portions of the front face of the lens with respect to the transverse plane of the lens. I have found the lens as above described very effective in practice for use particularly upon the sides of trucks or other vehicles in accordance with well understood practice.

While I have shown the front faces of the lenses of Figs. 2 and 6 in directly transverse position without curvature except for the slight deviation therefrom by reason of the grooves and ridges, it is to be understood that my invention broadly is not limited to such form but that other desired outlines might well be used with the grooves and ridges impressed thereon and having their defining faces angled only slightly from the general outline.

While I prefer to employ the form of construction as shown in my drawing and as above described, it is to be understood that my invention is not limited to the precise form shown except so far as the claims may be so limited by the prior art.

I claim:—

1. A reflecting lens having on one of its faces light-reflecting means adapted to reflect backwardly through the lens the major portion of the light entering the lens at its opposite face and having on said opposite face concave frusto-conical surfaces alternating with convex frusto-conical surfaces, said surfaces being concentric and deviating only slightly from parallelism with a transverse plane at right angles to the axis of said frusto-conical surfaces.

2. A reflecting lens having one face portion made up largely of outwardly extending light-reflecting projections arranged closely adjacent each other on a transverse plane at right angles to the axis of the lens, and having its other face portion divided into concentric zones comprising alternately arranged concave frusto-conical surfaces and convex frusto-conical surfaces, each of said surfaces deviating only slightly from parallelism with said transverse plane.

3. A reflecting lens having one face portion made up largely of outwardly extending light-reflecting projections arranged closely adjacent each other on a transverse plane at right angles to the axis of the lens, and having its other face portion divided into concentric zones comprising concave frusto-conical surfaces and convex frusto-conical surfaces interspersed with each other and deviating only slightly from parallelism with said transverse plane, the angularity of said surfaces with respect to said transverse plane differing from one surface to another.

ABRAHAM NECHIN.